(12) United States Patent
Ficarra et al.

(10) Patent No.: US 8,556,063 B2
(45) Date of Patent: Oct. 15, 2013

(54) DRY ICE BELT CLEANING SYSTEM FOR LASER CUTTING DEVICE

(75) Inventors: Richard P. Ficarra, Williamson, NY (US); Thomas C. McGraw, Macedon, NY (US); Gordon B. Reid, Walworth, NY (US); Derek A. Bryl, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/352,377

(22) Filed: Jan. 18, 2012

(65) Prior Publication Data

US 2013/0180075 A1  Jul. 18, 2013

(51) Int. Cl.
*B65G 45/22* (2006.01)

(52) U.S. Cl.
USPC .......................................... 198/495; 198/494

(58) Field of Classification Search
USPC ................................................ 198/493–499
See application file for complete search history.

(56) References Cited

U.S. PATENT DOCUMENTS

| | | | | |
|---|---|---|---|---|
| 4,243,136 A * | 1/1981 | Kaufman | ....................... | 198/493 |
| 4,830,175 A * | 5/1989 | Durst et al. | ................... | 198/495 |
| 5,024,319 A * | 6/1991 | Dixon et al. | .................. | 198/494 |
| 5,544,736 A * | 8/1996 | Piriou et al. | .................. | 198/493 |
| 6,536,220 B2 * | 3/2003 | Visaisouk | ......................... | 62/71 |
| 6,638,062 B1 * | 10/2003 | Davidson | ...................... | 198/494 |
| 7,134,946 B1 * | 11/2006 | Jackson | .......................... | 134/10 |
| 2002/0166328 A1 * | 11/2002 | Visaisouk | ........................ | 62/66 |
| 2008/0216870 A1 * | 9/2008 | Merritello | ........................ | 134/8 |
| 2010/0243410 A1 * | 9/2010 | Hall et al. | ..................... | 198/495 |

* cited by examiner

*Primary Examiner* — James R Bidwell
(74) *Attorney, Agent, or Firm* — Alix, Yale & Ristas, LLP

(57) ABSTRACT

A belt cleaning system to clean a conveyor belt having a carrier surface includes a dry ice blasting device and a debris recovery subsystem. The dry ice blasting device includes a delivery system having at least one nozzle disposed adjacent the conveyor belt. Dry ice pellets are discharged from the nozzle onto the conveyor belt carrier surface, whereby the dry ice pellets remove the debris from the carrier surface. The debris recovery subsystem includes a collector housing disposed adjacent to the conveyor belt carrier surface. The collector housing contains the debris removed from the conveyor belt carrier surface and directs the debris away from the conveyor belt.

17 Claims, 3 Drawing Sheets

DRY ICE BELT CLEANING SYSTEM FOR LASER CUTTING DEVICE

BACKGROUND

This disclosure relates generally to apparatus for laser cutting of paper. More particularly, the present disclosure relates to conveyor belts used to transport paper articles to and from a laser cutting device.

Paper debris and contamination build up on the laser cutting vacuum transport belt. The laser heats up the debris on following passes which in turn bakes the debris onto the transport belt, the baked-on debris absorbing extra energy, warping the belt, burning through the belt, and causing the belt to fail prematurely.

A conventional approach to solving this problem is to clean the belt periodically by hand or with a mechanical activated scraper blade while the machine is running. However, the debris builds up between cleansing, the belt warps, becomes tacky, and documents become difficult to remove.

If scraped: 1) debris builds up on the scraping edge of the blade, reducing the effectiveness of the blade; 2) the blade scratches the belt, making it more difficult to remove the contamination; and 3) the blade cannot access the warped areas of the transport belt. If hand cleaned, both the cleaning solution and debris get pulled through the vacuum holes and migrate to the underside of the belt, which in turn can cause drive problems and more belt failures.

SUMMARY

There is provided a belt cleaning system to clean a conveyor belt having a carrier surface. The system comprises a dry ice blasting device and a debris recovery subsystem. The dry ice blasting device includes a delivery system having at least one nozzle disposed adjacent the conveyor belt. Dry ice pellets are discharged from the nozzle onto the conveyor belt carrier surface, whereby the dry ice pellets remove the debris from the carrier surface. The debris recovery subsystem includes a collector housing disposed adjacent to the conveyor belt carrier surface. The collector housing contains the debris removed from the conveyor belt carrier surface and directs the debris away from the conveyor belt.

The debris recovery subsystem also includes a first seal sealing the collector housing to the dry ice blasting device delivery system and a second seal sealing the collector housing to the conveyor belt.

The debris recovery subsystem may further include a waste container in fluid communication with an exhaust port of the collector housing. The waste container may be vented to atmosphere or to a vacuum device.

The debris recovery subsystem may further include a vacuum system in fluid communication with an exhaust port of the collector housing.

The debris recovery subsystem may further include a secondary collector housing disposed adjacent to the conveyor belt inner surface. The secondary collector housing contains debris that is forced through the conveyor belt from the carrier surface and directs the debris away from the conveyor belt.

The debris recovery subsystem may further include a third seal sealing the secondary collector housing to the conveyor belt.

The waste container is in fluid communication with an exhaust port of the secondary collector housing.

The dry ice blasting device delivery system may also include a cross-process traversing device or multiple nozzles defining a nozzle array extending across the conveyor belt.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

With reference to the drawings wherein like numerals represent like parts throughout the several figures, a belt cleaning system in accordance with the present disclosure is generally designated by the numeral 10. The dry ice belt cleaning system 10 may be used for cleaning the web of a conveyor belt, for example a conveyor belt for transporting articles to and from a laser cutting device.

Figure 1:
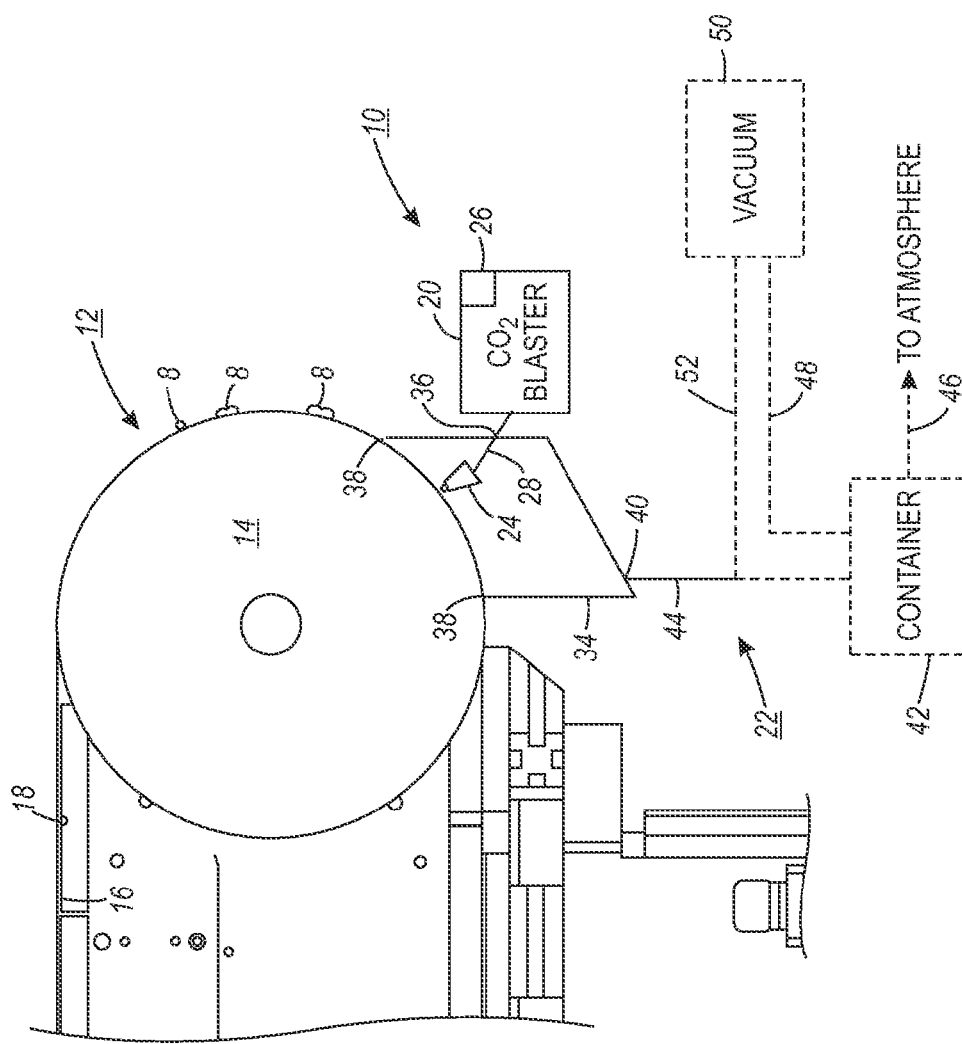
FIG. 1 is a schematic view of a first embodiment of a dry ice belt cleaning system in accordance with the present disclosure installed on a conveyor.

Referring first to FIG. 1, a conveyor 12 includes a nose roller 14 about which is wrapped a conveyor belt 16 or web. Positioned closely adjacent the periphery of the conveyor belt 16 is a first embodiment of the dry ice belt cleaning system 10 which spans the width of the belt 16. The dry ice belt cleaning system 10 substantially continuously cleans the conveyor belt 16, thereby preventing debris 8 from accumulating on the carrier surface 18 of the conveyor belt 16 and removing the debris 8 before it can reach the laser area (not shown). The clean belt surface 18 reflects the laser, preventing laser induced etching and warping found in conventional systems and thereby extending the life of the conveyor belt 16. The dry ice belt cleaning system utilizes a dry ice blasting device 20 and a debris recovery subsystem 22 to remove contamination from the conveyor belt 16

Dry ice blasting is a form of abrasive blasting, where dry ice is accelerated in a pressurized air stream and directed at a high speed at a surface in order to clean it. The method is similar to other forms of abrasive blasting such as sand blasting, but substitutes dry ice as the blasting medium. The dry ice pellets are softer and less dense than other media used in blasting-cleaning (i.e. sand or plastic pellets). The dry ice pellets sublimate substantially upon impact, transferring minimal kinetic energy to the surface on impact, producing minimal abrasion, and leaving no residue. The sublimation process absorbs a large volume of heat from the surface, producing shear stresses due to thermal shock. This is assumed to improve cleaning as the top layer debris is expected to transfer more heat than the underlying substrate and flake off more easily. The rapid change in state from solid to gas also causes microscopic shock waves, which are also thought to assist in removing the debris.

Figure 3:
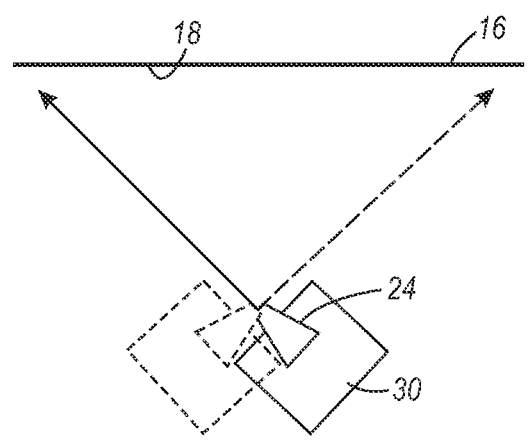
FIG. 3 is a schematic view of a first variation of the nozzle (s) of FIG. 1.
Figure 4:
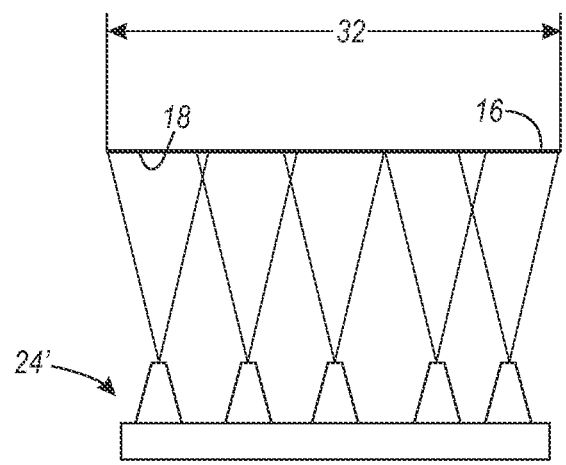
FIG. 4 is a schematic view of a second variation of the nozzle(s) of FIG. 1.

With additional reference to FIGS. 3 and 4, the dry ice blasting device 20 includes a nozzle 24 or an array of nozzles 24', a dry ice storage container 26 to hold a supply of dry ice or a hopper to receive a supply of dry ice, and a delivery system 28, 28' to transport the dry ice from the storage container/hopper and discharge the dry ice from the nozzle(s) 24, 24' onto the carrier surface 18 of the conveyor belt 16. One of two delivery systems 28, 28' may be used to combine compressed air with the dry ice and accelerate particles of the dry ice out of the delivery nozzle 24, 24'.

A two-hose delivery system 28 delivers compressed air through one hose, and dry ice pellets were sucked out of a second hose by the venturi effect. A single-hose delivery system 28' uses a single hose to deliver air and dry ice. Compared to a single-hose system 26', the two-hose system 28 delivers dry ice pellets with less force (approximately 5% for a given air supply) than a single-hose system. Two hose systems 28 also a limit to the vertical distance between the machine and applicator. This is generally not significant because the limit is well in excess of 25 feet. Two hose systems 28 are generally less costly to produce due to a much simpler design and they allow finer particles of dry ice to be delivered with lower velocity as the late combination of warm air with cold ice results in less sublimation in the hose. The latter properties allow for more delicate surfaces to be cleaned.

The nozzle(s) 24, 24' is positioned adjacent the conveyor belt 16 such that dry ice pellets discharged from the nozzle(s) is directed onto the carrier surface 18 of the conveyor belt 16. Contamination is removed as a result of the blast. One or more nozzle(s) 24 can be attached to a cross-process traversing device 30 to oscillate the nozzle(s) 24 to systematically clean the conveyor belt a section at a time. Alternatively, the entire width 32 of the conveyor belt 16 may be cleaned simultaneously with a nozzle array 24' that discharges dry ice across the width 32 of the conveyor belt 16. Cleaning can be continuous or periodic depending on requirements.

The debris recovery subsystem 22, 22' includes a collector housing 34 that contains the dry ice blast and directs the loosened debris, dry ice particles, and $CO_2$ gas away from the conveyor belt 16. The housing 34 encapsulates the blast area by having a seal 36 around the nozzle or hose(s) and also seals 38 to the conveyor belt 16. The debris, dry ice particles, and $CO_2$ gas are carried through an exhaust port 40 exiting the housing 34 and may be directed to a waste container 42 by way of a discharge line 44. The container 42 can be vented 46 to atmosphere, allowing the airflow from the dry ice blasting process to carry debris to the container 42. Alternatively, the waste container 42 may be vented 48 to a vacuum device 50 to facilitate evacuate debris from the collector housing 34 or the exhaust port 40 may be connected 52 to a vacuum device 50.

Figure 2:
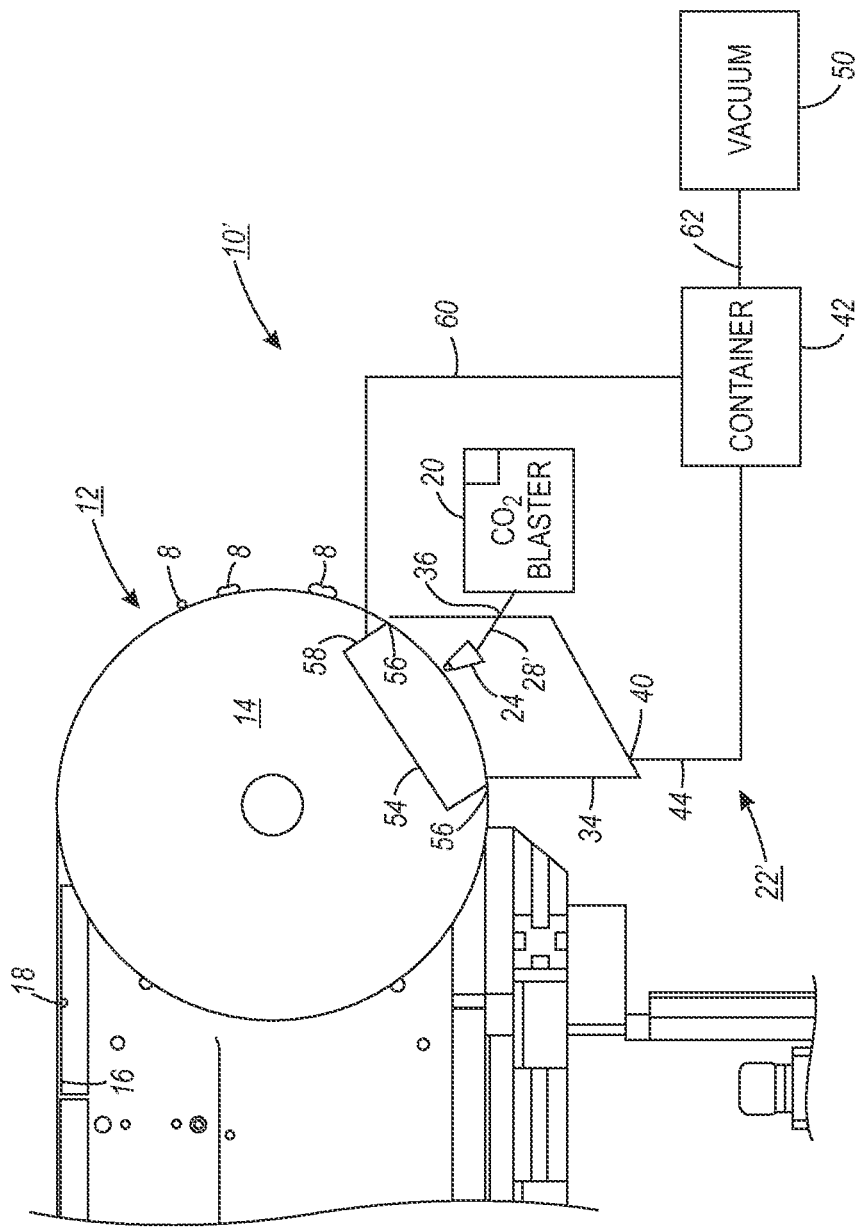
FIG. 2 is a schematic view of a second embodiment of a belt cleaning system in accordance with the present disclosure installed on a conveyor

In a second embodiment, the debris recovery system 22' of the dry ice belt cleaning system 10' (FIG. 2) includes a secondary collector housing 54 installed on the inner side of the conveyor belt 16 to remove debris that is forced through the vacuum belt holes of the conveyor belt 16. Similar to the primary collector housing 34, the secondary collector housing 54 includes seals 56 to the conveyor belt. The exhaust port of the primary collector housing and exhaust port 58 of the secondary collector housing 54 are connected to the waste container 42, which is vented 62 to a vacuum device 50 to facilitate evacuating debris from the primary collector housing 34 and to provide the motive force to evacuate debris from the secondary collector housing 54.

It should be appreciated that dry ice blasting can remove the toughest of contamination from the conveyor belt 16, but leaves no residue. The dry ice particles can penetrate vacuum belt holes for thorough cleaning. Cleaning contamination from the belt helps maintain reflectivity of the carrier surface 18. This prevents extra laser energy from absorbing into the conveyor belt 16 and causing damage.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A belt cleaning system to clean debris from a conveyor belt having an outer carrier surface to transport paper articles to and from a laser cutting device and an inner surface, the system comprising:
    a dry ice blasting device including a delivery system having at least one nozzle disposed adjacent the conveyor belt adapted to discharge a plurality of dry ice pellets onto the conveyor belt carrier surface, whereby the dry ice pellets remove the debris from the carrier surface; and
    a debris recovery subsystem including
        a collector housing disposed adjacent to the conveyor belt carrier surface, the collector housing being adapted to contain the debris removed from the conveyor belt carrier surface and to direct the debris away from the conveyor belt, and
        a first seal sealing the collector housing to the dry ice blasting device delivery system and a second seal sealing the collector housing to the conveyor belt.

2. The belt cleaning system of claim 1 wherein the debris recovery subsystem further includes a waste container in fluid communication with an exhaust port of the collector housing.

3. The belt cleaning system of claim 2 wherein the waste container is vented to atmosphere.

4. The belt cleaning system of claim 2 wherein the waste container is vented to a vacuum device.

5. The belt cleaning system of claim 1 wherein a vacuum system is in fluid communication with an exhaust port of the collector housing.

6. The belt cleaning system of claim 4 wherein the debris recovery subsystem further includes a secondary collector housing disposed adjacent to the conveyor belt inner surface, the secondary collector housing being adapted to contain debris that is forced through the conveyor belt from the carrier surface and to direct the debris away from the conveyor belt.

7. The belt cleaning system of claim 6 wherein the debris recovery subsystem further includes a third seal sealing the secondary collector housing to the conveyor belt.

8. The belt cleaning system of claim 7 wherein the waste container is in fluid communication with an exhaust port of the secondary collector housing.

9. The belt cleaning system of claim 1 wherein the dry ice blasting device delivery system also includes a cross-process traversing device.

10. The belt cleaning system of claim 1 wherein the dry ice blasting device delivery system includes a plurality of nozzles defining a nozzle array extending across the conveyor belt.

11. A belt cleaning system to clean debris from a conveyor belt having an outer carrier surface to transport paper articles to and from a laser cutting device and an inner surface, the system comprising:
    a dry ice blasting device including a delivery system having at least one nozzle disposed adjacent the conveyor belt adapted to discharge a plurality of dry ice pellets onto the conveyor belt carrier surface, whereby the dry ice pellets remove the debris from the carrier surface; and
    a debris recovery subsystem including a primary collector housing disposed adjacent to the conveyor belt carrier surface, the primary collector housing having an exhaust port, a first seal sealing the collector housing to the dry ice blasting device delivery system, a second seal sealing the collector housing to the conveyor belt, and a waste container in fluid communication with the collector housing exhaust port;

wherein the primary collector housing is adapted to contain the debris removed from the conveyor belt carrier surface and to direct the debris away from the conveyor belt to the waste container.

12. The belt cleaning system of claim 11 wherein the waste container is vented to atmosphere.

13. The belt cleaning system of claim 11 wherein the waste container is vented to a vacuum device.

14. The belt cleaning system of claim 13 wherein the debris recovery subsystem also includes a secondary collector housing disposed adjacent to the conveyor belt inner surface, the waste container being in fluid communication with an exhaust port of the secondary collector housing, the secondary collector housing being adapted to contain debris that is forced through the conveyor belt from the carrier surface and to direct the debris away from the conveyor belt to the waste container.

15. The belt cleaning system of claim 14 wherein the debris recovery subsystem further includes a third seal sealing the secondary collector housing to the conveyor belt.

16. The belt cleaning system of claim 11 wherein the dry ice blasting device delivery system also includes a cross-process traversing device.

17. The belt cleaning system of claim 11 wherein the dry ice blasting device delivery system includes a plurality of nozzles defining a nozzle array extending across the conveyor belt.

* * * * *